United States Patent [19]

Elphingstone et al.

[11] 4,231,882
[45] Nov. 4, 1980

[54] TREATING SUBTERRANEAN WELL FORMATIONS

[75] Inventors: Eugene A. Elphingstone; Lewis R. Norman, both of Duncan, Okla.

[73] Assignee: Halliburton Company, Duncan, Okla.

[21] Appl. No.: 953,284

[22] Filed: Oct. 20, 1978

Related U.S. Application Data

[63] Continuation of Ser. No. 871,735, Jan. 23, 1978, abandoned.

[51] Int. Cl.$^3$ .............................................. E21B 43/27
[52] U.S. Cl. .............................. 252/8.55 C; 166/307; 252/8.55 R; 252/316
[58] Field of Search .............. 252/8.55 R, 8.55 C, 252/8.5 R, 8.5 B, 8.5 LC; 252/316; 166/307, 308

[56] References Cited

U.S. PATENT DOCUMENTS

| | | | |
|---|---|---|---|
| 2,198,120 | 4/1940 | Lerch et al. | 166/292 |
| 2,330,145 | 9/1943 | Reimers | 252/8.55 X |
| 2,596,137 | 5/1952 | Fast | 252/8.55 X |
| 3,373,107 | 3/1968 | Rice et al. | 252/8.55 |
| 3,378,074 | 4/1968 | Kiel | 166/308 |
| 4,061,580 | 12/1977 | Jahnke | 252/8.55 |

FOREIGN PATENT DOCUMENTS 733033 4/1966 Canada ........................................ 252/8.5

*Primary Examiner*—Herbert B. Guynn
*Attorney, Agent, or Firm*—Thomas R. Weaver; John H. Tregoning; C. Clark Dougherty, Jr.

[57] ABSTRACT

A method of treating a subterranean well formation wherein a low pH highly viscous thixotropic treating fluid is introduced into the formation. The treating fluid is formed by combining an aqueous acid solution with an aqueous alkali metal silicate solution and a gelling agent whereby a highly viscous polymerized alkali metal silicate gel of low pH is produced followed by shearing of the gel to impart thixotropic properties thereto.

35 Claims, No Drawings

TREATING SUBTERRANEAN WELL FORMATIONS

This is a Continuation of application Ser. No. 871,735, filed Jan. 23, 1978, now abandoned.

In the treatment of subterranean well formations it is often desirable or necessary to introduce a low pH highly viscous treating fluid into the formation. For example, in hydraulic fracturing processes carried out in subterranean formations, i.e., creating and/or propping fractures in formation, highly viscous fracturing fluids of low pH are often utilized with or without propping agent suspended therein. Commonly, such fracturing fluids are pumped into a formation being treated at a rate and pressure sufficient to produce one or more fractures therein. Continued pumping of the fracturing fluid extends the fractures, and when the fracturing fluid contains propping agent suspended therein, the propping agent is left in the fracture. Because the fracturing fluid is of low pH, minerals in the formation are dissolved whereby the pore spaces therein are opened or enlarged and the permeability of the formation increased.

Highly viscous well formation treating fluids are particularly advantageous in carrying out fracturing and/or acidizing procedures in that such fluids are capable of opening one or more fractures to a width sufficient to place propping agent therein without excessive leak-off of the fluid, and such highly viscous fluids are capable of maintaining propping agent in suspension for long periods of time without excessive settling. However, problems have been encountered in the use of high viscosity low pH treating fluids utilized heretofore, e.g., complexed natural gum and cellulose derivative gels, in that such gels generally become less viscous when high formation temperatures are encountered, i.e., above about 140° F., and/or break down and become less viscous in the presence of acid. Such reduction in viscosity in well formation treating fluids can often produce undesirable results. For example, if the fluid is used as a fracturing fluid with propping agent suspended therein, a reduction in the viscosity of the fluid allows the propping agent to rapidly settle resulting in adequate propping of fractures produced. Also, heretofore used complexed gels often cause significant damage to the formation treated therewith, i.e., bring about a reduction in the permeability thereof.

In carrying out the treatment of subterranean well formations using highly viscous fluids, it is desirable that the fluids be thixotropic, i.e., that the fluids have the property of developing a low viscosity in turbulent flow, but exhibiting a high viscosity when at rest, the transition being reversible. By the present invention, methods of treating subterranean well formations with highly viscous thixotropic treating fluids of low pH which are stable at high temperatures and which are relatively non-damaging to the treated formation are provided.

The method of the present invention for treating a subterranean well formation comprises combining an aqueous acid solution with an aqueous alkali metal silicate solution having a pH greater than about 11 and a gelling agent comprised of a solution of a water soluble organic solvent and an ethoxylated fatty amine thereby forming a low pH highly viscous polymerized alkali metal silicate gel, shearing the gel to obtain a highly viscous treating fluid having thixotropic properties and then introducing the treating fluid into the subterranean well formation.

A variety of alkali metal silicates can be utilized in accordance with the present invention, e.g., sodium, potassium, lithium, rubidium and cesium silicate. Of these, sodium silicate is preferred, and of the many forms in which sodium silicate exists, those having an $Na_2O:SiO_2$ weight ratio in the range of from about 1:2 to about 1:4 are most preferred. A specifically preferred material for use in accordance with the method of the present invention is a commercially available aqueous sodium silicate solution having a density of 11.67 pounds per gallon, an $Na_2O:SiO_2$ weight ratio of about 1:3.22 (Grade 40) and having the following approximate analysis:

| Component | % by Weight |
|---|---|
| $Na_2O$ | 9.1 |
| $SiO_2$ | 29.2 |
| Water | 61.7 |
| TOTAL | 100.00 |

A variety of acids can also be used, either organic or inorganic as well as acid producing materials. Examples of inorganic acids which can be used are hydrochloric acid, sulfuric acid, phosphoric acid and nitric acid. Examples of organic acids which can be used are formic acid and acetic acid. An example of an acid forming material which can be used is benzotrichloride. Of the acids and acid forming materials which can be used, hydrochloric acid, sulfuric acid, phosphoric acid and mixtures of such acids are preferred with hydrochloric acid being the most preferred. As will be understood by those skilled in the art, hydrofluoric acid cannot be utilized in that its reaction with silicates has an adverse affect on the formation of polymerized silicate gel.

In preparing a highly viscous fluid having thixotropic properties and a low pH for treating a subterranean well formation, an aqueous alkali metal silicate solution having a pH of greater than about 11 is first prepared. Such a solution using Grade 40 sodium silicate solution starting material is prepared by mixing about 5 parts by volume Grade 40 sodium silicate solution with about 95 parts by volume water. The resulting solution has a pH in the range of from about 11 to about 12, and a viscosity of about 1 centipoise. To this solution is added an aqueous acid solution, such as a 20° Bé aqueous hydrochloric acid solution, while agitating the mixture, to lower the pH of the mixture to a value in the range of from about 7.5 to about 8.5 whereby the alkali metal silicate polymerizes to form a highly viscous rigid gel. While a polymerized silicate gel will form at pH levels other than from about 7.5 to about 8.5, the rate of formation of the gel is greatest in such range.

Upon polymerization of the alkali metal silicate in the manner described above, a highly crosslinked rigid gel structure is formed which is not soluble in water, but which is gelatinous due to water being entrapped in the polymer structure. In order to impart thixotropic properties to the polymerized silicate gel, it is sheared by mixing or agitation, preferably while the polymerization reaction is taking place. It is believed the shearing of the gel divides it into fine particles carrying static charges which will not agglomerate into a mass and which exhibit thixotropic properties, i.e., a low viscosity in turbulent flow but a high viscosity when at rest or at low shear rates.

Additional aqueous acid solution is added to the gel to obtain a low pH treating fluid of desired acid strength. For example, additional acid solution can be added to the gel in an amount sufficient to obtain a mixture containing excess acid in a quantity in the range of from about 1 percent to about 5 percent by weight of the mixture. However, the addition of excess acid to the polymerized silicate gel causes the gel to thin out and lose its thixotropic properties to some degree. This is believed to be due to the fact that the sheared gel particles have negative static charges which cause the particles to repel each other which in turn gives the gel its thixotropic properties. When excess acid is added to the gel, the negative charges are at least partially neutralized which decreases the thixotropic properties. In order to overcome this problem and to increase the viscosity of the gel mixture containing excess acid, a viscosity increasing chemical which also functions as a surfactant, hereinafter referred to as a "gelling agent", is combined with the polymerized sodium silicate gel prior to adding the excess acid therewith. It is believed the surface active properties of the gelling agent prevent the charged particles from agglomerating in the presence of acid and thereby prevent the corresponding thinning out and loss of thixotropic properties.

A gelling agent suitable for use in accordance with this invention is comprised of a solution of a water soluble organic solvent and an ethoxylated fatty amine having the general formula:

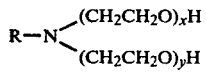

wherein:
R is selected from saturated and unsaturated aliphatic groups having in the range of from about 8 to about 22 carbon atoms, and mixtures thereof, and x and y each have a value in the range of from 0 to about 10.

The preferred ethoxylated fatty amines and mixtures thereof useful herein are those wherein the average sum of the values of x and y in the amines used is in the range of from about 1.8 to about 2.2.

Mixtures of ethoxylated tertiary fatty amines derived from fats and oils such as coconut oil, soy bean oil, and tallow are particularly suitable for use in accordance with the present invention.

A preferred mixture of ethoxylated fatty amines is a mixture of amines of the general formula:

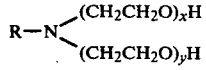

wherein:
R is selected from the group consisting of saturated and unsaturated chains of aliphatic groups having in the range of from about 14 to about 18 carbon atoms and mixtures of such groups; and wherein the average sum of the values of x and y in the mixture of ethoxylated amines is equal to 2.

In the most preferred embodiment, x and y each have a value of 1 (one).

Examples of such amines are those derived from fatty acids of the type hexadecyl, tallow, soya and oleyl, either saturated or unsaturated and as pure components or mixtures.

A variety of organic solvents can be utilized in the gelling agent so long as such solvents are capable of dissolving the ethoxylated fatty amines and are water soluble. Examples of such water soluble organic solvents include alkanols having in the range of about 1 to 5 carbon atoms per molecule, such as methanol, ethanol, isopropanol and t-butanol; ketones having in the range of about 3 to 6 carbon atoms per molecule, such as acetone and methylethyl ketone; polyhydroxy compounds having in the range of about 2 to 6 carbon atoms per molecule, such as ethylene glycol and glycerine; ethers having in the range of about 2 to 6 carbon atoms per molecule, such as dioxane and tetrahydrofuran; compounds containing both ether and alcohol functions having in the range of about 4 to 8 carbon atoms per molecule, such as diethylene glycol and triethylene glycol; organic acids having in the range of about 1 to 10 carbon atoms per molecule, such as formic acid, malonic acid, acetic acid, gluconic acid, levulinic acid and propionic acid; esters having in the range of about 2 to 6 carbon atoms per molecule, such as methyl formate, dimethyl oxylate and dimethyl malonate; and lactones having in the range of about 3 to 5 carbon atoms per molecule, such as beta-propyl lactone and gamma-butyl lactone. Due to the desirably low freezing point and/or high flash point (tag closed cup) of the resulting gelling agent, the organic acids are preferred with acetic acid being the most preferred.

The water soluble organic solvent useful herein is preferably in liquid phase at the temperature at which it is mixed with the ethoxylated fatty amines. Furthermore, mixtures of the organic solvents can be used. An example is a mixture of methanol and gluconic acid.

The gelling agents useful herein can be prepared by mixing the water soluble organic solvents with the ethoxylated fatty amines for a period of time sufficient to completely dissolve the amines in the solvent. The quantity of ethoxylated amines dissolved in the organic solvent range in an amount of from about 10 percent to about 80 percent by weight, preferably from about 50 percent to about 60 percent amine by weight of the gelling agent.

As mentioned above, the organic solvents can be used singly, or in mixtures of solvents of the same chemical class (acids with acids, ketones with ketones and the like) or in mixtures of solvents of different chemical classes (acids with alcohols, ethers with ketones and the like). A preferred organic solvent is a mixture of chemicals of different chemical classes wherein at least one of the classes is an organic acid.

Ethoxylated fatty amines of the type described above are very difficult to dissolve directly in aqueous acid solutions. However, the amines are easily dissolved in the above-mentioned water soluble organic solvents, and the resultant solution is readily dissolved in an aqueous acid solution and immediately increases the viscosity of the solution.

A gelling agent comprised of an ethoxylated fatty amine or mixture of such amines of the type described above dissolved in a water soluble organic solvent, preferably acetic acid, is combined with the polymerized silicate gel in an amount of from about 0.01 percent to about 5.0 percent by volume of the gel. Excess acid is then added to the gel to obtain a low pH treating fluid of desired acid strength, and the mixture is sheared to impart thixotropic properties thereto.

An alternate procedure for forming a highly viscous thixotropic acidic treating fluid is to combine an aqueous alkali metal silicate solution having a pH greater than about 11 with a concentrated aqueous acid solution in a quantity whereby excess acid is present in the resulting mixture in an amount in the range of from about 1 percent by weight to about 28 percent by weight while mixing or agitating the resultant mixture. A polymerized alkali metal silicate gel is formed in the mixture at a rapid rate resulting in a highly viscous acidic fluid. The gelling agent described above is combined with the fluid to increase the viscosity thereof and impart stability thereto, and in order to impart thixotropic properties to the fluid, it is sheared in the manner described above.

In fracturing and/or acidizing a subterranean well formation in accordance with the method of the present invention, an aqueous acid solution, preferably 30 to 35 percent by weight hydrochloric acid, is combined with an alkali metal silicate solution, preferably sodium silicate, having a pH of greater than about 11, in an amount sufficient to lower the pH of the resulting mixture to a level in the range of from about 7.5 to about 8.5 thereby forming a polymerized alkali metal silicate gel. The gelling agent described above is combined with the polymerized silicate gel in an amount in the range of 0.01 percent to about 5.0 percent by volume of the gel and the mixture is agitated or mixed while the polymerized silicate gel is being formed to thereby shear the gel and impart thixotropic properties thereto. Additional aqueous acid solution is added to the mixture so that the resulting treating fluid contains excess acid, preferably in an amount in the range of from about 1 percent to about 5 percent by weight of the fluid. Other conventional well treating additives and propping agent, if used, are also added to the fluid while it is being agitated and the resulting low pH treating fluid is introduced into a subterranean formation at a flow rate and pressure sufficient to produce a fracture therein and simultaneously acidizing the formation, i.e., dissolve minerals in the formation whereby the pore spaces are opened or enlarged and the permeability of the formation increased.

Where it is desired to fracture and/or acidize a subterranean well formation with a treating fluid having a higher concentration of excess acid, the aqueous alkali metal silicate solution having a pH of greater than about 11 is combined with a concentrated aqueous acid solution (30 to 35 percent by weight acid) in a quantity whereby excess acid is present in the resulting mixture in a desired amount, preferably in an amount in the range of from about 1 percent by weight to about 28 percent by weight. The gelling agent described above is combined with the mixture in an amount in the range of from about 0.01 percent to about 5.0 percent by volume of the mixture and the resultant mixture is agitated so that as the polymerized silicate gel is formed it is sheared and thixotropic properties are imparted thereto. Conventional well treating additives and propping agent, if used, are added to the treating fluid followed by introducing the treating fluid into a formation to be treated.

The low pH polymerized silicate treating fluids can be prepared in batch or they can be prepared continuously while being pumped or otherwise introduced into a subterranean well formation. After being introduced into the formation, the polymerized silicate gel dehydrates at a relatively rapid rate, and consequently it is not necessary to include a chemical for breaking the sodium silicate gel in the fluids. The time required for the gel to dehydrate depends on the rate of water loss to the formation and other factors, but generally such time is within the range of from about 4 hours to about 24 hours. Upon dehydrating, some powdered silicate remains in the treated formation which can readily be removed by contacting the formation with hydrofluoric acid. Prior to the dehydration of the polymerized silicate gel, it has excellent stability, i.e., retains its high viscosity over a wide temperature range (up to about 500° F.). The treating fluids are particularly suitable for treating subterranean well formations of low permeability in that they are relatively non-damaging to such formations as compared to conventional high viscosity fluids, i.e., do not appreciably reduce the permeability thereof.

The following examples are presented to further illustrate the invention.

EXAMPLE 1

Several polymerized sodium silicate gels are prepared in the laboratory using a Grade 40 sodium silicate solution. The quantities of Grade 40 sodium silicate solution, tap water containing 2 percent potassium chloride and 20° Bé hydrochloric acid (approximately 31.45 percent by weight hydrochloric acid) shown in Table I below are used. Except for those gels which are prepared by directly combining the acid and sodium silicate solutions, several drops of phenophthalein indicator are added to the diluted sodium silicate solution followed by the addition of hydrochloric acid solution in the amount required to reach an end point, i.e., a pH in the range of from about 8 to about 8.5. Following the addition of the acid and while the polymerized sodium silicate gel forms, the mixture is sheared for 10 minutes using a Jabsco pump.

The gels contain 5 percent, 7½ percent and 10 percent by volume Grade 40 sodium silicate and the last three gels shown in Table I contain excess acid in the amounts given. Viscosities of the gels are apparent viscosities measured on a Model 35 FANN viscometer, No. 1 spring, standard bob and sleeve at room temperature and at 300 rpm.

TABLE I

| VISCOSITIES OF VARIOUS POLYMERIZED SODIUM SILICATE GELS | | | | | | | |
|---|---|---|---|---|---|---|---|
| Sodium Silicate Solution | | | | Polymerized Sodium Silicate Gel | | | |
| Water Containing 2% HCl, ml | Grade 40 Sodium Silicate Solution, ml | pH | Acid Solution, ml | pH | % by Volume Grade 40 Sodium Silicate | Viscosity, cp | Excess Acid, % By Volume |
| 932 | 50 | 11–12 | 18 (20° Be HCl) | 8.5 | 5 | 30 | 0 |
| 899.4 | 75 | 11–12 | 25.6 (20° Be HCl) | 8.0 | 7.5 | 40 | 0 |
| 868 | 100 | 11–12 | 32 (20° Be HCl) | 8.0 | 10.0 | 70 | 0 |
| 0 | 500 | >12 | 500 (20° Be HCl)[1] | <1 | 5 | 30 | 15 |
| 782 | 50 | 11–12 | 18 (20° Be HCl) | 8.0 | 5 | 30 | 5 |

TABLE I-continued

VISCOSITIES OF VARIOUS POLYMERIZED SODIUM SILICATE GELS

| Sodium Silicate Solution | | | | Polymerized Sodium Silicate Gel | | | |
|---|---|---|---|---|---|---|---|
| Water Containing 2% HCl, ml | Grade 40 Sodium Silicate Solution, ml | pH | Acid Solution, ml | pH | % by Volume Grade 40 Sodium Silicate | Viscosity, cp | Excess Acid, % By Volume |
| 15 | 10 | 11–12 | 150 (20° Be HCl)[2] 175 (20° Be HCl)[1] | <1 | 5 | 30 | 28 |

[1] HCl and Sodium Silicate combined directly.
[2] Polymerized Sodium Silicate gel formed first followed by addition of excess acid.

EXAMPLE 2

Ethoxylated soya (mixture of chains having 14, 16 and 18 carbon atoms) amines having an average of 2 moles of ethylene oxide per mole of amine are tested in the laboratory for increasing the viscosity and stabilizing acidic polymerized sodium silicate gel. The procedure for testing the amines is to first prepare a polymerized sodium silicate gel containing 5 percent excess acid in accordance with the procedure set forth in Example 1. The amines are diluted in equal volumes of acetic acid and added to the sodium silicate gel in the quantity indicated in Table II below while agitating the mixture. Viscosities are measured using a Model 35 FANN viscometer, No. 1 spring, standard bob and sleeve at 300 rpm.

TABLE II

Viscositites Of Polymerized Sodium Silicate Gels Containing Excess Acid and Gelling Agent

| Gelling Agent Used | Quantity of Gelling Agent Combined with Sodium Silicate Gel, Gallons Gelling Agent/1000 Gallons Sodium Silicate Gel | Viscosity of Sodium Silicate Gel Without Gelling Agent cp | Viscosity of Sodium Silicate Gel with Gelling Agent cp |
|---|---|---|---|
| Ethoxylated soya amine-acetic acid | 5 | 7 | 34 |
| Ethoxylated soya amine-acetic acid | 3 | 7 | 29 |
| Ethoxylated soya amine-acetic acid | 1 | 7 | 20 |

As shown in Table II, the ethoxylated soya amine gelling agent improves the overall viscosity of a sodium silicate gel containing excess acid. Observations of the gel indicate that the gel is consistent and thick with little water separation. In addition, the gelling agent stabilizes the gel and prevents loss of viscosity and thixotropic properties.

EXAMPLE 3

A gelling agent is prepared by dissolving 3 grams of ethoxylated soya amines having an average of 2 moles of ethylene oxide per mole of amine in 6 mls. of glacial acetic acid. The approximate composition of the soya fatty acids from which the soya amine is derived is as follows:

| Acid | % by Weight |
|---|---|
| myristic ($C_{14}$) | 0 to 1% |
| palmitic ($C_{16}$) | 6 to 10% |
| stearic ($C_{18}$) | 2 to 4% |
| oleic ($C_{18}$) | 21 to 29% |
| linoleic ($C_{18}$) | 50 to 59% |
| linolenic ($C_{18}$) | 4 to 8% |

The gelling agent is combined with 125 mls. of an aqueous hydrochloric acid solution containing 15 percent by weight hydrochloric acid. The gelling agent is readily mixed with the aqueous acid solution, and after mixing, the aqueous acid solution has an apparent viscosity of 95 centipoises measured on a Model 35 FANN viscometer, No. 1 spring, standard bob and sleeve at room temperature and 300 rpm.

EXAMPLE 4

Liquid permeability tests are carried out in the laboratory using Berea sandstone (high permeability), Bandera sandstone (medium permeability) and Ohio sandstone (low permeability). Tap water containing 2 percent by weight potassium chloride is first caused to flow through the test cores at an upstream pressure of approximately 120 psig and the liquid permeability of the cores calculated from the average flow rate of liquid flowing through the cores, the liquid viscosity, the core length, liquid pressure, and core area. The cores are next treated with a 5 percent polymerized sodium silicate gel prepared as described in Example 1 by flowing the gel through the cores followed by immersion of the cores in the gel for from about 15 to about 24 hours during which time the gel is caused to break. The cores are then reverse flowed with tap water containing 2 percent by weight potassium chloride and the liquid permeability calculated. Additional cores are tested in the same manner, but the cores are treated with a highly viscous gel formed from water and hydroxypropyl guar gum (40 pounds hydroxypropyl guar gum per 1000 gallons of water) instead of the sodium silicate gel. The results of these tests are given in Table IV below.

TABLE IV

Comparison Of Core Liquid Permeabilities Before and After Treatment With Polymerized Sodium Silicate Gel and Hydroxypropyl Guar Gum Gel

| Type of Core | Type of Gel Used | Initial Liquid Permeability, md | Final Liquid Permeability, md | Change in Liquid Permeability As a Result of Treatment |
|---|---|---|---|---|
| Berea Sandstone | Polymerized Sodium Silicate Gel | 16.2 | 17.3 | 7% Increase |
| Berea Sandstone | Hydroxypropyl Guar | | | |

TABLE IV-continued

Comparison Of Core Liquid Permeabilities Before and After Treatment With Polymerized Sodium Silicate Gel and Hydroxypropyl Guar Gum Gel

| Type of Core | Type of Gel Used | Initial Liquid Permeability, md | Final Liquid Permeability, md | Change in Liquid Permeability As a Result of Treatment |
|---|---|---|---|---|
| | Gum Gel | 18.9 | 8 | 58% Decrease |
| Bandera Sandstone | Polymerized Sodium Silicate Gel | 2.62 | 2.07 | 21% Decrease |
| Bandera Sandstone | Hydroxypropyl Guar Gum Gel | 3.01 | 0.81 | 73% Decrease |
| Ohio Sandstone | Polymerized Sodium Silicate Gel | 0.51 | 0.43 | 16% Decrease |
| Ohio Sandstone | Hydroxypropyl Guar Gum Gel | 0.50 | 0.13 | 74% Decrease |

From Table IV it can be seen that the polymerized sodium silicate gel is relatively non-damaging to formation permeability and is considerably less damaging to formation permeability than hydroxypropyl guar gum gel.

We claim:

1. A method of forming a low pH highly viscous thixotropic fluid for use in treating a subterranean well formation comprising the steps of:
combining an aqueous solution of acid other than hydrofluoric acid with an aqueous alkali metal silicate solution having a pH of greater than about 11 in an amount sufficient to lower the pH of the resulting mixture to the level in the range of from about 7.5 to about 8.5 thereby forming a polymerized alkali metal silicate gel;
combining a gelling agent with said polymerized alkali metal silicate gel, said gelling agent consisting of a solution of a water soluble organic solvent and a mixture of ethoxylated fatty amines having the general formula:

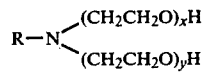

wherein:
R is selected from saturated and unsaturated aliphatic groups having in the range or from about 8 to about 22 carbon atoms, and
x and y each have a value in the range of from 0 to about 10 but both x and y are not 0; and
said ethoxylated fatty amine is present in said gelling agent in an amount in the range of from about 10% to about 80% by weight of said gelling agent;
combining additional aqueous solution of acid other than hydrofluoric acid with said polymerized alkali metal silicate gel-gelling agent mixture in an amount sufficient to obtain a mixture containing excess acid in the range of from about 1% to about 28% by weight of said mixture; and
shearing said mixture to thereby obtain a highly viscous thixotropic treating fluid.

2. The method of claim 1 wherein the average sum of the values of x and y in said mixture is in the range of from about 1.8 to about 2.2.

3. The method of claim 1 wherein said alkali metal silicate is sodium silicate.

4. The method of claim 1 wherein said aqueous sodium silicate solution is Grade 40 sodium silicate solution diluted with water.

5. The method of claim 3 wherein said acid is selected from the group consisting of hydrochloric acid, sulfuric acid, phosphoric acid and mixtures thereof.

6. The method of claim 5 wherein said acid is hydrochloric acid.

7. The method of claim 1 wherein R is selected from the group consisting of saturated and unsaturated aliphatic groups having in the range of from about 14 to about 18 carbon atoms and mixtures of such groups, and wherein the average sum of the values of x and y in said mixture of ethoxylated amines is equal to 2.

8. The method of claim 7 wherein said organic solvent is an organic acid.

9. The method of claim 8 wherein said organic acid is acetic acid.

10. The method of claim 7 wherein said organic solvent in said gelling agent is acetic acid and said ethoxylated fatty amines are present in said gelling agent in an amount of about 50% by weight of said gelling agent.

11. The method of claim 1 wherein said gelling agent includes an ethoxylated fatty amine having the general formula:

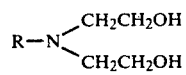

wherein:
R is selected from saturated and unsaturated aliphatic groups having in the range of from about 8 to about 22 carbon atoms.

12. The method of claim 1 wherein said mixture of additional aqueous solution of acid other than hydrofluoric acid and said polymerized alkali metal silicate gel-gelling agent mixture contains excess acid in the range of from about 1% to about 5% of said mixture.

13. A method of forming a low pH highly viscous thixotropic fluid for use in treating a subterranean well formation comprising the steps of:
combining an aqueous alkali metal silicate solution having a pH greater than about 11 with an aqueous solution of acid other than hydrofluoric acid in a quantity whereby excess acid is present in the resulting mixture in an amount in the range of from about 1% by weight to about 28% by weight and whereby a polymerized alkali metal silicate gel is formed therein;
combining a gelling agent with said polymerized alkali metal silicate gel, said gelling agent consisting of a solution of a water soluble organic solvent and a mixture of ethoxylated fatty amines having the general formula:

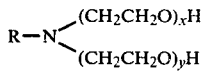

wherein:
R is selected from saturated and unsaturated aliphatic groups having in the range of from about 8 to about 22 carbon atoms and mixtures thereof, and
x and y each have a value in the range of from 0 to about 10 with the average sum of the values of x and y in said mixture being in the range of from about 1.8 to about 2.2;
said ethoxylated fatty amine is present in said gelling agent in an amount in the range of from about 10% to about 80% by weight of said gelling agent; and
shearing said polymerized alkali metal silicate gel-gelling agent mixture to thereby obtain a highly viscous thixotropic acidic treating fluid.

14. The method of claim 13 wherein said alkali metal silicate is sodium silicate.

15. The method of claim 13 wherein said aqueous sodium silicate solution is Grade 40 sodium silicate solution diluted with water.

16. The method of claim 14 wherein said acid is selected from the group consisting of hydrochloric acid, sulfuric acid, phosphoric acid and mixtures thereof.

17. The method of claim 16 wherein said acid is hydrochloric acid.

18. The method of claim 13 wherein R is selected from the group consisting of saturated and unsaturated aliphatic groups having in the range of from about 14 to about 18 carbon atoms and mixtures of such groups, and wherein the average sum of the values of x and y in said mixture of ethoxylated amines is equal to 2.

19. The method of claim 18 wherein said organic solvent is an organic acid.

20. The method of claim 19 wherein said organic acid is acetic acid.

21. The method of claim 18 wherein said organic solvent in said gelling agent is acetic acid and said ethoxylated fatty amines are present in said gelling agent in an amount of about 50% by weight of said gelling agent.

22. The method of claim 13 wherein said gelling agent includes an ethoxylated fatty amine having the general formula:

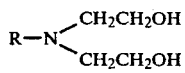

wherein:
R is selected from saturated and unsaturated aliphatic groups having in the range of from about 8 to about 22 carbon atoms.

23. A method of fracturing and simultaneously acidizing a subterranean well formation comprising the steps of:
combining an aqueous solution of acid other than hydrofluoric acid with an aqueous alkali metal silicate solution having a pH of greater than about 11 in an amount sufficient to lower the pH of the resulting mixture to a level in the range of from about 7.5 to about 8.5 thereby forming a polymerized alkali metal silicate gel;
combining a gelling agent with said polymerized alkali metal silicate gel, said gelling agent consisting of a solution of a water soluble organic solvent and a mixture of ethoxylated fatty amines having the general formula:

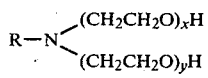

wherein:
R is selected from saturated and unsaturated aliphatic groups having in the range of from about 8 to about 22 carbon atoms and mixtures thereof, and
x and y each have a value in the range of from 0 to about 10 with the average sum of the values of x and y in said mixture being in the range of from about 1.8 to about 2.2;
said ethoxylated fatty amine is present in said gelling agent in an amount in the range of from about 10% to about 80% by weight of said gelling agent;
combining additional aqueous solution of acid other than hydrofluoric acid with said polymerized alkali metal silicate gel-gelling agent mixture in an amount sufficient to obtain a mixture containing excess acid in the range of about 1% to about 28% by weight of said mixture;
shearing said mixture to thereby obtain a highly viscous thoxitropic acidic treating fluid; and
introducing said treating fluid into said subterranean formation at a flow rate and pressure sufficient to produce a fracture therein.

24. The method of claim 23 wherein said aqueous alkali metal silicate solution is Grade 40 sodium silicate diluted with water.

25. The method of claim 24 wherein said acid is hydrochloric acid.

26. The method of claim 23 wherein R is selected from the group consisting of saturated and unsaturated aliphatic groups having in the range of from about 14 to about 18 carbon atoms and mixtures of such groups, and wherein the average sum of the values of x and y in said mixture of ethoxylated amines is equal to 2.

27. The method of claim 26 wherein said organic solvent in said gelling agent is acetic acid and said ethoxylated fatty amines are present in said gelling agent in an amount of about 50% by weight of said gelling agent.

28. The method of claim 27 which is further characterized to include the step of combining a propping agent with said mixture prior to introducing said mixture into said subterranean formation.

29. The method of claim 23 wherein said mixture of additional aqueous solution of acid other than hydrofluoric acid and said polymerized alkali metal silicate gel-gelling agent mixture contains excess acid in the range of from about 1% to about 5% of said mixture.

30. A method of fracturing and simultaneously acidizing a subterranean well formation comprising the steps of:
combining an aqueous alkali metal silicate solution having a pH of greater than about 11 with an aqueous solution of acid other than hydrofluoric acid in a quantity whereby excess acid is present in the resulting mixture in an amount in the range of from about 1% by weight to about 28% by weight of said mixture and whereby a polymerized alkali metal silicate gel is formed therein;
combining a gelling agent with said polymerized alkali metal silicate gel, said gelling agent consisting of a solution of a water soluble organic solvent and a mixture of ethoxylated fatty amines having the general formula:

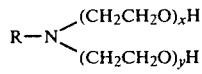

wherein:
R is selected from saturated and unsaturated aliphatic groups having in the range of from about 8 to about 22 carbon atoms and mixtures thereof, and
x and y each have a value in the range of from 0 to about 10 with the average sum of the values of x and y in said mixtures being in the range of from about 1.8 to about 2.2; and
said ethoxylated fatty amine is present in said gelling agent in an amount in the range of from about 10% to about 80% by weight of said gelling agent;
shearing said polymerized alkali metal silicate gel-gelling agent mixture to thereby obtain a highly viscous thixotropic acidic treating fluid; and introducing said treating fluid into said subterranean formation at a flow rate and pressure sufficient to produce a fracture therein.

31. The method of claim 30 wherein said aqueous alkali metal silicate solution of Grade 40 sodium silicate diluted with water.

32. The method of claim 31 wherein said acid is hydrochloric acid.

33. The method of claim 30 wherein R is selected from the group consisting of saturated and unsaturated aliphatic groups having in the range of from about 14 to about 18 carbon atoms and mixtures of such groups, and wherein the average sum of the values of x and y in said mixture of ethoxylated amines is equal to 2.

34. The method of claim 33 wherein said organic solvent in said gelling agent is acetic acid and said ethoxylated fatty amines are present in said gelling agent in an amount of about 50% by weight of said gelling agent.

35. The method of claim 34 which is further characterized to include the step of combining a propping agent with said mixture prior to introducing said mixture into said subterranean formation.

* * * * *

UNITED STATES PATENT AND TRADEMARK OFFICE
CERTIFICATE OF CORRECTION

PATENT NO. : 4,231,882
DATED : November 4, 1980
INVENTOR(S) : Eugene A. Elphingstone and Lewis R. Norman It is certified that error appears in the above-identified patent and that said Letters Patent are hereby corrected as shown below:

At Column 1, in line 45, delete [adequate] and insert --inadequate--.

At Column 12, Claim 23, in line 28, delete [thoxitropic] and insert --thixotropic--.

At Column 14, Claim 31, in line 5, delete [of] and insert --is--.

Signed and Sealed this

Twenty-first Day of April 1981

[SEAL]

Attest:

RENE D. TEGTMEYER

Attesting Officer     Acting Commissioner of Patents and Trademarks